Figure 1:
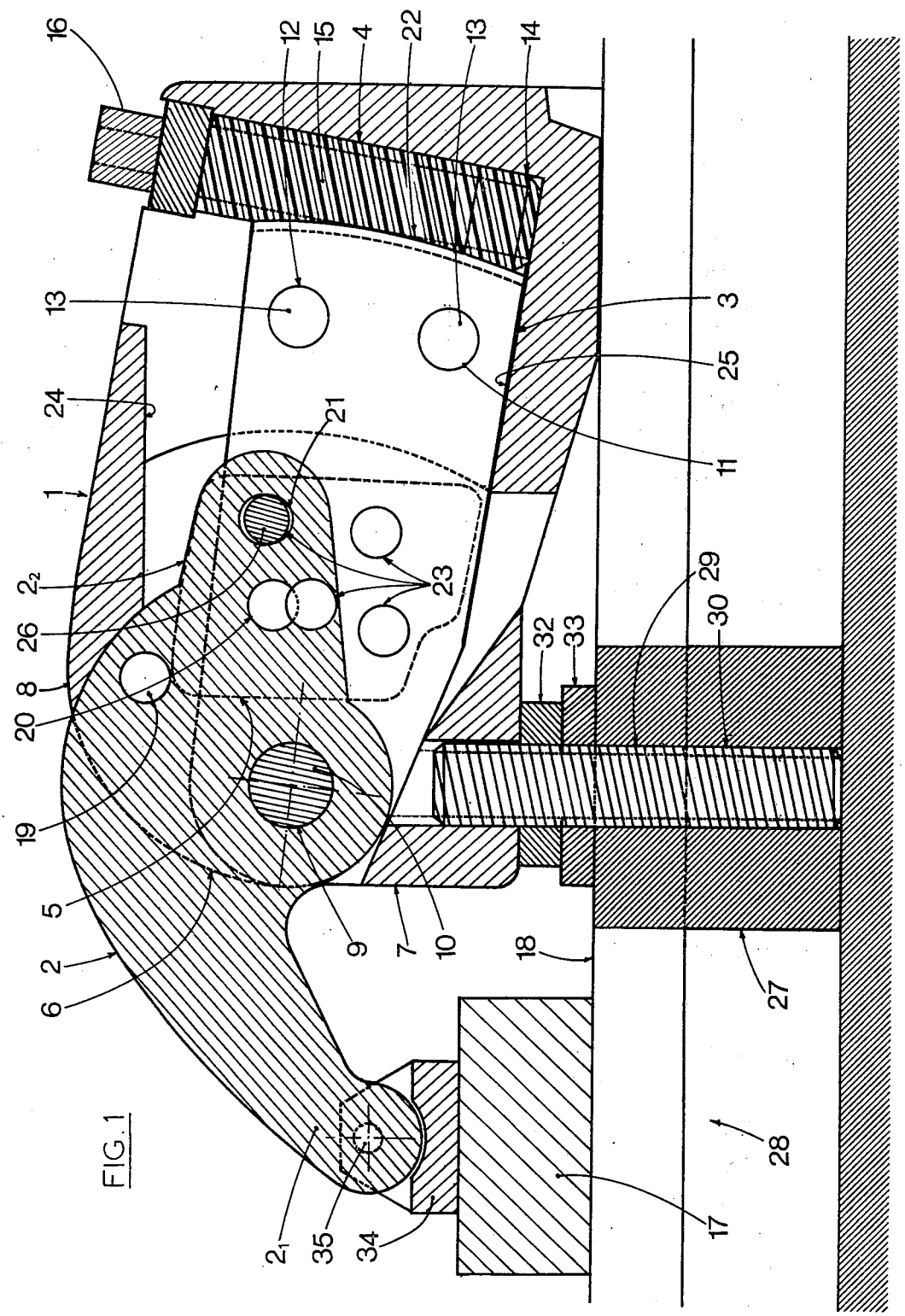

United States Patent [19]

Carossino

[11] 4,120,490
[45] Oct. 17, 1978

[54] CLAMPING DEVICE FOR A MACHINE TOOL

[76] Inventor: André Carossino, B.P. #755, 95004 Cergy Cedex, France

[21] Appl. No.: 884,306

[22] Filed: Mar. 7, 1978

[30] Foreign Application Priority Data

Mar. 10, 1977 [FR] France .............................. 77 07067
Jan. 23, 1978 [FR] France .............................. 78 01765

[51] Int. Cl.² .............................................. B23Q 3/06
[52] U.S. Cl. .................................... 269/94; 269/209; 269/238
[58] Field of Search .................. 269/93, 94, 209, 238

[56] References Cited

U.S. PATENT DOCUMENTS 1,490,063  4/1924  Tower .................................. 269/238
2,365,079  12/1944  Huber .................................. 269/94

Primary Examiner—Robert C. Watson
Attorney, Agent, or Firm—Michael F. Petock

[57] ABSTRACT

The clamping device comprises a housing and an anchoring device for fixing the housing to the table of a machine tool. A jaw for clamping the work to be machined to the table and a lever extending the jaw are both pivotally mounted on a pivot pin carried by the housing. An actuating device engages one end of the lever for shifting the lever about the pivot pin and is accessible from outside the housing. A detachable coupling device renders the lever rigid with the jaw in any one of a number of relative angular positions so that, when the actuating device shifts the lever, the lever and the jaw move together for clamping the work. A spacer block can be combined with the clamping device. The block has on its top side a cavity for receiving the anchor device of the clamping device and a lock member for engaging an aperture in the housing. The block has a bottom side provided with an anchoring device identical to the anchoring device of the clamping device and with an aperture for receiving the lock member of an identical spacer block placed thereunder. Consequently, a plurality of superimposed spacer blocks may be employed.

12 Claims, 2 Drawing Figures

CLAMPING DEVICE FOR A MACHINE TOOL

DESCRIPTION OF THE INVENTION

The invention relates to a clamping device for fixing work to be machined on the table of a machine tool having T-slots such as milling, drilling, shaping machines or the like.

As the work must be strongly fixed to the table of the machine tool to avoid the shifting thereof under the action of the tool, use is very often made of clamps of other clamping devices which are rendered for this purpose integral with the table of the machine.

Among these devices there is known (French Pat. No. 72 02940 of the Jan. 28, 1972 in the name of the applicant) an arrangement in which there is angularly displaced a pivotal toothed jaw connected to a tangential driving screw, these two members being disposed in a housing the lower face of which is provided with a T-section heel which is engaged in the slots of the table of the machine tool.

This type of device is effective when it concerns lightly clamping the work but becomes rather unreliable for a heavy clamping. Now, if the torque of the tool it high, the insufficiently clamped work is liable to move and even free itself from the device and becomes a real danger for the operator.

This insufficient clamping (which must be about 1.2. tons) is due to the fact that the lever between the jaw and the actuating screw, that is to say the distance between the axis of rotation of the jaw and the axis of the screw, is short and in particular less than the distance between the axis of the jaw and the operative end thereof so that the torque of jaw is low.

However, this distance between the axes could not be markedly increased without requiring a corresponding increase in the dimensions of the housing to permit housing and accommodating the movement of an increased lever. Such an arrangement consisting in multiplying by two or three the length of the lever would consequently be technically impossible since it involves a corresponding increase in the volume of the housing which would become heavy, space-consuming and difficult to place under milling heads in particular.

The present invention has the merit of providing a solution to this problem by substantially increasing the distance between the axis of rotation of the jaw and the axis of the screw without however markedly modifying the dimensions of the housing. This device is then capable of exerting pressures of 3 to 4 tons and consequently suitable for the clamping of any work, even on machines of large size.

According to the invention, there is provided a device for clamping work on a machine tool, of the type comprising a body in the form of a housing provided with anchoring means for fixing it to the table of the machine and a pivotal jaw the angular shifting of which is ensured by actuating means accessible from outside the housing, wherein the jaw is extended by an independent lever provided with means for coupling it to the actuating means, the jaw and the lever being connected to the housing to pivot about the same axis and being rotatable relative to each other and capable of being rendered rigid with each other in different angular positions by means of a detachable coupling means so as to swing together when the actuating means is brought into action. According to a feature of the invention, the lever is in the form of a sector and the end thereof opposed to that pivotally connected to the jaw is provided with theeth in mesh with the teeth of the actuating means which is in the form of a worm.

In a preferred embodiment, the lever is provided with four transverse orifices and each one thereof is capable of being brought selectively in alignment with one of three orifices of the same diameter extending through the jaw, the lever and the jaw being rendered rigid with each other to rotate together in a chosen angular position by means of a detachable pin.

According to another feature of the invention, the anchoring means comprises a screwthreaded rod which is screw-threadedly engaged in the lower side of the housing, a T-section heel engagable in a slot of corresponding shape of a table of a machine tool and a nut and lock washer which holds the device stationary with respect to the machine longitudinally of the slot.

Figure 2:
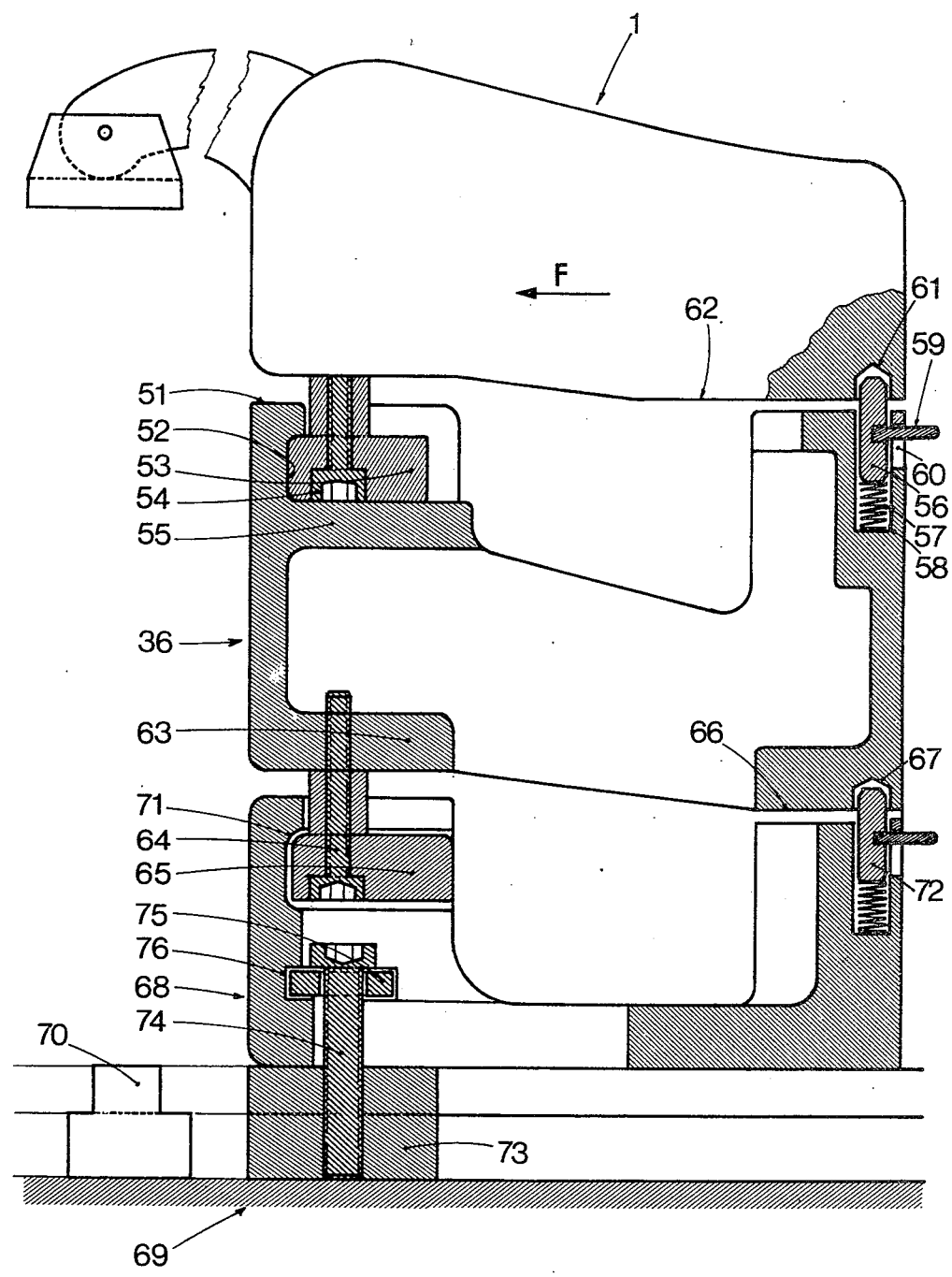

A clamping device according to the invention is shown by way of a nonlimitative example in the accompanying drawings in which, FIG. 1 is a longitudinal sectional view, and FIG. 2 is a partial sectional view of the clamping device provided with an inserted raising block.

The device according to the invention comprises essentially four elements, a housing 1 forming the body of the device, a rotatively mounted jaw 2, a lever 3 mounted to be pivotable about the same pivot pin as the jaw, and an actuating means 4 accessible from outside the housing.

The housing 1 is in the form of a cast metal block of substantially parallel-sided shape, this block being hollow and accessible from outside by way of an opening 5 in one of the lateral walls of the housing and by way of an opening 6 in the front wall 7 of the housing, the latter opening matching the part-circular profile of this front wall 7 and being connected to the upper wall 8 of the housing.

The two lateral walls of the housing are provided with an orifice 9 acting as a bearing for a pivot pin 10 on which the jaw 2 and the lever 3 are rotatably mounted. Thus the jaw and the lever are angularly movable on the common pin 10 and are rotatively movable with respect to each other.

The housing further comprises two other circular orifices 11 and 12 in which are engaged counter-reaction studs 13 which respectively abut against the two lateral faces of the rear end of the lever 3, these studs being offset in height so as to avoid a warping of the lever when it is driven by the actuating means 4.

For reasons of clarity, the two counter-reaction studs 13 have been illustrated in FIG. 1 so as to show their respective positions, although, from drawing point of view, only one of these two studs can in fact be seen bearing in mind the plane of the sectional view. The body or housing has a recess 14 in which the actuating means 4 is inserted, this actuating means being in the considered embodiment formed by a worm 15 the upper end portion of which is provided with a polygonal head 16, for example a hexagonal head, for the purpose of driving it for example with a crank.

The jaw 2 is formed by a clamping finger member 2, which is adapted to bear against the work 17 to be machined which bears on the top of the table 18 of the machine tool such as a milling, drilling or shaping machine or the like. This jaw is pivotally mounted on the pivot pin 10 and has a heel portion $2_2$ which partly overlaps the lever 3. The jaw also has three transverse orifices 19, 20, and 21 for the purpose of coupling the jaw to the lever 3 in different angular positions, as indicated hereinafter. The jaw is freely pivotable about the pin 10 owing to the provision of the opening 6 shown on the front wall of the housing 1.

The lever 3 is in the form of a sector one of the end portions of which is pivotally mounted on the pin 10 whereas the opposite end portion 22 is provided with teeth which engage the teeth of the worm 15 which is tangential to the teeth of the lever. The lever has four transverse orifices 23 which may be brought selectively in alignment with any one of the orifices 19, 20 or 21 of the jaw.

The lever 3 is angularly movable about the pin 10 and its travel is limited by the inner walls 24 and 25 of the upper and lower sides of the housing.

The set of orifices 19, 20, 21 and 23 of the jaw and lever permits a coupling of these two members in different angular positions by means of a pin 26 which is inserted in the orifices brought into alignment with each other. The effect of this pin is to render the jaw and lever integral with each other so that they pivot together about the pin 10 when the actuating worm 15 is rotated.

The effect of the selection of the angular position of the jaw with respect to the lever is to divide the amplitude of the latter in that its travel corresponds to the coming into immediate contact of the jaw with the work to be machined. In other words, the jaw is first brought as close as possible to the work to be machined by the rough adjustment of the pin 26, then the fine adjustment and clamping is achieved by a short travel of the lever under the action of the actuating worm 15. This arrangement has for effect to permit a marked increase in the distance between the axis of the pin 10 and the median axis of the actuating worm 15 without a corresponding substantial increase in the volume of the housing 1.

The clamping device is held stationary with respect to the table of the machine tool by a T-section heel 27 which slides in one of the slots 28 of complementary section provided in tables of machine tools. The heel 27 is connected to the body of the housing by a screw 29 which is partly screwthreadedly engaged in a tapped orifice 30 of the heel and in a tapped orifice 31 of the housing.

This orifice also receives a hexagonal lock nut 32 associated with a washer 33, this nut bearing against the upper face 18 of the table of the machine tool so as to secure the clamping device linearly relative to the table while allowing the rotation of the clamping device.

The clamping finger 2₁ of the jaw 2 is provided with a U-shaped cradle 34 which is pivotally mounted on a pin 35 and is shown in section. The cradle is capable of assuming different angular positions relative to the clamping finger member 2₁ so that it is able to bear against work having oblique faces.

In FIG. 2 the clamping device thus described is associated with one or more spacer blocks 36 adapted to raise the clamping device for the purpose of clamping work of great height.

This spacer block is formed by a substantially parallel-sided hollow housing having in the vicinity of its upper face 51 a cavity 52 which has a shape complementary to that of the anchoring means 53 with which the clamping device proper or the adjoining spacer block is provided.

It must be mentioned here that the spacer block may be used alone with the clamping device or combined with other superimposed identical spacer blocks if the work to be clamped is of great height. In the considered embodiment, the block 35 is used alone.

The cavity 52 is formed by a machining in which the anchoring means 53 is engaged. The latter may have an inverted T-shaped section (identical to the anchoring means 27 of FIG. 1) and the anchoring means is rendered integral with the housing 1 of the clamping device by a screw 54 having a head of the hexagon socket type.

This machined part 52 forms with a rib 55 which extends inwardly of the block 36 the cavity in which the anchoring means 53 is locked.

The locking is completed by a lock member 56 formed by a stud which is constantly biased to a position in which it projects from the upper face 51 of the block 36 by a spring 57, this stud being engaged in a blind aperture 58 in the block 36 and being rigid with a radial finger member 59 which is slidable in an opening 60 formed in the wall of the block.

The housing 1 of the clamping device or the spacer block is locked by a simple forward sliding (arrow F) of the anchoring means 53 in the cavity 52 and by the penetration of the stud 56 in a complementary blind aperture 61 formed in the lower face 62 of the housing 1 of the clamping device or spacer block.

The spacer block 36 has a second rib 63 which also extends inwardly of the block and serves to fix, by means of a screw 64 having a hexagon socket, an anchoring means 65 identical to the anchoring means 53.

The lower face 66 of the spacer block 36 also has a blind aperture 67 identical to the aperture 61 of the housing 1.

The spacer block 36 is used in association with a shoe 68 adapted to be clamped on a table 69 of the machine tool which has in the known manner a slot 70 having an inverted T-shaped section. The shoe has, in the same way as the block 36, a cavity 71 which is identical to the cavity 52 and is adapted to receive the anchoring means 65. It also has a lock member which is exactly identical to the lock member 56 adapted to be engaged in the aperature 67 of the block 36.

The shoe comprises fixing means 73 which has a shape complementary to the slot 70 of the table of the machine tool and is assembled with the shoe by a screw 74 having a head of the hexagon socket type and bearing against a washer 75 which is locked in a cavity 76 milled in the body of the shoe 68.

Before mounting the block 36, the screw 74 is accessible for tightening from inside the shoe with the aid of a tool and thus serves to clamp the shoe to the table of the machine tool and consequently to clamp the assembly of superimposed elements: spacer blocks and housing 1.

The essential feature of these spacer blocks resides in the fact each one thereof has both male and female parts which enable them to be coupled together or assembled with the fixing shoe 68 or with the housing 1 of the clamping device. Indeed, all the anchoring means 53 or 65 are strictly identical, as are the lock members 56 or 72 and the locking cavities 52 or 74 receiving the anchoring means 53 and 65.

Owing to this simple and practical arrangement, there is obtained a stable clamping device having modular components with a variable number of spacer blocks.

What is claimed is:

1. A device for clamping work to be machined on a table of a machine tool, the device comprising means defining a body in the form of a housing, anchoring means for fixing it to the table of the machine tool, a pivotal jaw mounted on the housing to pivot about an axis, actuating means mounted on the housing to be accessible from outside the housing, an independent lever which extends the jaw and is mounted on the housing to pivot about said axis, means coupling the lever to the actuating means for pivoting the lever about said axis, the jaw and the lever being relatively pivotable about said axis, and detachable coupling means for rendering the jaw and lever rigid with each other in different selectable relative angular positions so as to pivot together when the actuating means is brought into action.

2. A device as claimed in claim 1, wherein the lever is in the form of a sector having an end portion remote from said axis provided with teeth which are engaged with teeth of the actuating means which is in the form of a worm rotatably mounted in the housing.

3. A device as claimed in claim 1, wherein said detachable coupling means comprises four transverse orifices in the lever and three orifices of the same diameter in the jaw, each of the orifices of the lever being capable of being selectively brought into alignment with one of the three orifices of the jaw, and a detachable pin engaged in the aligned orifices, the lever and for rendering the lever and the jaw rigid with each other in a chosen relative angular position.

4. A device as claimed in claim 1, wherein the anchoring means comprises a screwthreaded rod which is screwthreadedly engaged in a lower part of the housing, a T-section heel for engaging a slot of corresponding shape of the table of the machine tool, the rod being engaged in the heel, and a lock nut and washer for the rod whereby the device is held linearly stationary relative to the machine.

5. A device as claimed in claim 1, wherein an end of the jaw is provided with a pivotable cradle capable of bearing on inclined faces of the work.

6. A device as claimed in claim 1, wherein the housing is a cast housing comprising lateral side walls and top and bottom side walls, a first opening in one of the lateral side walls providing access to the detachable coupling means of the lever arm and jaw, and a second front opening for allowing angular movement of the jaw, the bottom and top side walls of the housing defining inner faces forming abutments defining ends of travel of the lever.

7. A device as claimed in claim 6, wherein the housing is provided with two offset orifices which extend through the two lateral side walls, said two orifices receiving counter-reaction studs which extend inwardly of the housing and engage the lever and preclude warping of the lever when it is driven by the actuating means.

8. A device for clamping work to be machined on a table of a machine tool, the device comprising means defining a body in the form of a housing, anchoring means for fixing it to the table of the machine tool, a pivotal jaw mounted on the housing to pivot about an axis, actuating means mounted on the housing to be accessible from outside the housing, an independent lever which extends the jaw and is mounted on the housing to pivot about said axis, means coupling the lever to the actuating means for pivoting the lever about said axis, the jaw and the lever being relatively pivotable about said axis, and detachable coupling means for rendering the jaw and lever rigid with each other in different selectable relative angular positions so as to pivot together when the actuating means is brought into action, in combination with at least one spacer block having an upper side defining a cavity having a shape which is complementary to the anchoring means of the housing, means defining an aperture in a bottom wall of the housing, a lock member carried by the spacer block and engaged in the aperture of the housing, the spacer block having a lower side provided with an anchoring means identical to the anchoring means of the housing and an aperture identical to the aperture of the housing for receiving the lock member of a subjacent spacer block if used.

9. A device as claimed in claim 8, wherein the spacer block is combined with a shoe which has an upper side defining a cavity having a shape complementary to the shape of the anchoring means of the spacer block disposed thereabove and provided with a lock member which is engaged in said aperture of said block, the shoe further comprising a fixing means which is accessible from the outside the shoe and capable of clamping said shoe in slots of the table of the machine tool.

10. A device as claimed in claim 8, wherein the spacer block is hollow and has internally a lower transverse rib provided with a tapped orifice and an upper transverse rib forming with a machined recess in the block said cavity for receiving the anchoring means of the housing or of another spacer block placed thereon, the anchoring means of the spacer block comprising a screwthreaded rod screwthreadedly engaged in said tapper orifice.

11. A device as claimed in claim 8, wherein the lock member comprises a blind aperture of the spacer block, a spring-biased stud mounted in said blind aperture, an opening formed in the spacer block, and a finger member integral with the stud and slidable in the opening of the spacer block and projecting outwardly from the spacer block.

12. A device as claimed in claim 9, comprising means defining a longitudinal slot in the shoe, a screw having a head with a hexagon socket slidable in the slot and accessible from outside the shoe, a tapped orifice in said fixing means and in which an end of said screw is engaged, a clamping recess formed in the shoe, a lock washer engaged in the recess, and receiving the screw, the head of the screw bearing against said washer.

* * * * *